(12) United States Patent
Perichon et al.

(10) Patent No.: US 10,807,632 B2
(45) Date of Patent: Oct. 20, 2020

(54) LOW INITIAL RESISTANCE STEERING COLUMN CRASH APPARATUS

(71) Applicant: Robert Bosch Automotive Steering LLC, Florence, KY (US)

(72) Inventors: Olivier Perichon, Independence, KY (US); Ricky Mains, Morning View, KY (US); William F. Scroggin, Cincinnati, OH (US)

(73) Assignee: Robert Bosch Automotive Steering LLC, Florence, KY (US)

( * ) Notice: Subject to any disclaimer, the term of this patent is extended or adjusted under 35 U.S.C. 154(b) by 52 days.

(21) Appl. No.: 16/317,646

(22) PCT Filed: Jul. 31, 2017

(86) PCT No.: PCT/IB2017/054654
§ 371 (c)(1),
(2) Date: Jan. 14, 2019

(87) PCT Pub. No.: WO2018/025160
PCT Pub. Date: Feb. 8, 2018

(65) Prior Publication Data
US 2019/0283795 A1    Sep. 19, 2019

Related U.S. Application Data

(60) Provisional application No. 62/369,396, filed on Aug. 1, 2016.

(51) Int. Cl.
*B62D 1/19* (2006.01)
*B62D 1/184* (2006.01)

(52) U.S. Cl.
CPC ............. *B62D 1/195* (2013.01); *B62D 1/184* (2013.01)

(58) Field of Classification Search
CPC .......... B62D 1/195; B62D 1/184; B62D 1/19; B62D 1/192
(Continued)

(56) References Cited

U.S. PATENT DOCUMENTS

| 8,033,574 B2 * | 10/2011 | Menjak | F16F 7/123 280/777 |
| 9,663,136 B2 * | 5/2017 | Stinebring | B62D 1/195 |

(Continued)

OTHER PUBLICATIONS

Written Opinion of the International Searching Authority, dated Nov. 27, 2017.
International Search Report, dated Nov. 27, 2017.

*Primary Examiner* — Paul N Dickson
*Assistant Examiner* — Hilary L Johns
(74) *Attorney, Agent, or Firm* — Schaffer, Schaub & Marriott, Ltd.

(57) ABSTRACT

An adjustable steering column (5) that is designed to absorb energy by collapsing is described. The steering column (5) has a jacket body (10) secured to the vehicle and a steering shaft assembly (17) adjustably and slidably positioned in the jacket body (10). An energy absorbing strap (23) has a second end (26) secured to the jacket body (10) and a first end (25) releasably secured to the steering shaft assembly (17). The energy absorbing strap (23) being disposed to deform to absorb energy when the steering shaft assembly (17) is displaced with respect to the jacket body (10). The energy absorbing strap (23) is deformed at a second predetermined energy absorbing rate. A spring plate (41) has its first end (43) secured to the jacket body (10) and a second end (45) releasably engaging the energy absorbing strap (23). At least one elongated slot (47) is positioned adjacent the first end (43) of the spring plate (41). A securing device (49) is positioned in the at least one slot (47) to secure the spring plate (41) to the jacket body (10). The securing device
(Continued)

(49) secures the spring plate (41) to the jacket body (10) at a first energy absorbing rate. The first energy absorbing rate being lower than the second energy absorbing rate.

12 Claims, 4 Drawing Sheets

(58) Field of Classification Search
USPC .......................................................... 280/777
See application file for complete search history.

(56) References Cited

U.S. PATENT DOCUMENTS

| | | | |
|---|---|---|---|
| 2006/0273569 A1* | 12/2006 | Manwaring | B62D 1/195 280/777 |
| 2007/0013183 A1* | 1/2007 | Jensen | B62D 1/195 280/777 |
| 2010/0300238 A1* | 12/2010 | Ridgway | B62D 1/192 74/493 |
| 2012/0125139 A1* | 5/2012 | Tinnin | B62D 1/184 74/493 |
| 2015/0128752 A1* | 5/2015 | Buzzard | B62D 1/195 74/493 |
| 2015/0375770 A1* | 12/2015 | Buzzard | B62D 1/184 74/493 |
| 2016/0046318 A1* | 2/2016 | Stinebring | B62D 1/195 74/493 |
| 2016/0368524 A1* | 12/2016 | Tinnin | B62D 1/192 |
| 2017/0120945 A1* | 5/2017 | Stinebring | B62D 1/195 |
| 2017/0259842 A1* | 9/2017 | Dubay | B62D 1/195 |
| 2017/0320513 A1* | 11/2017 | Dubay | B62D 1/184 |

* cited by examiner

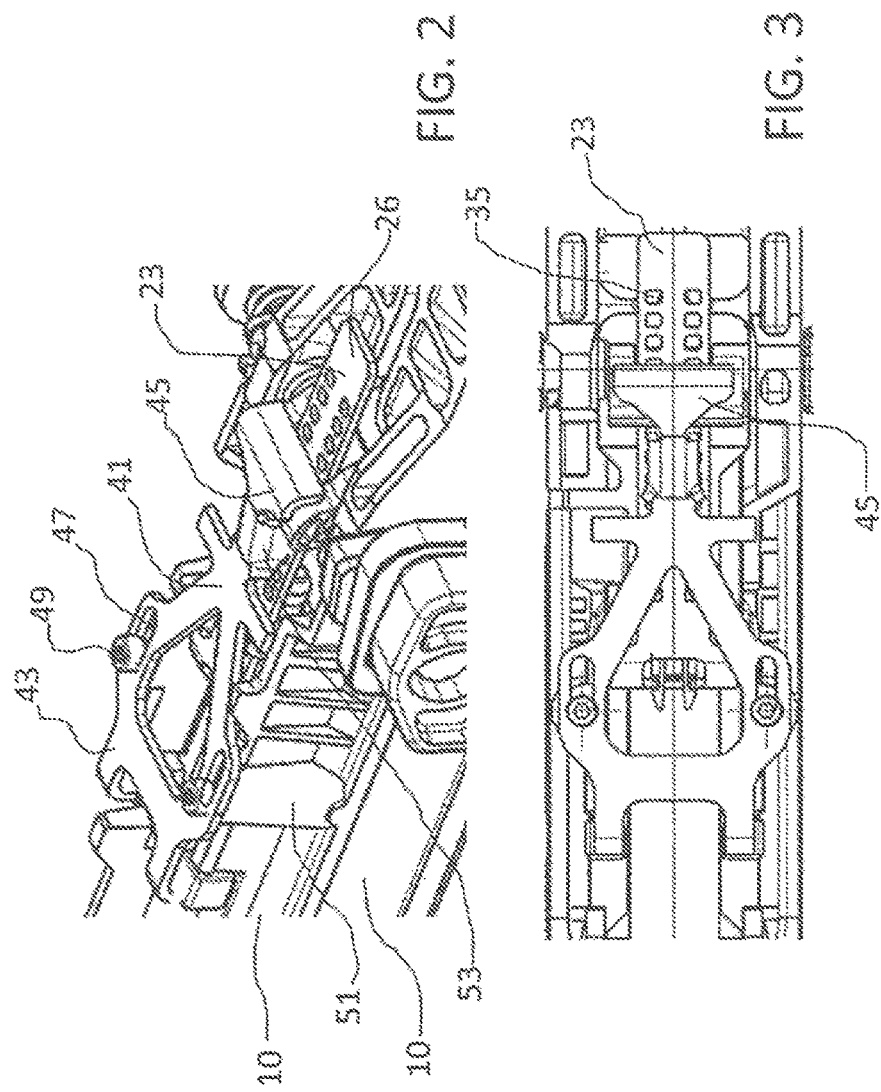
FIG. 2
FIG. 3
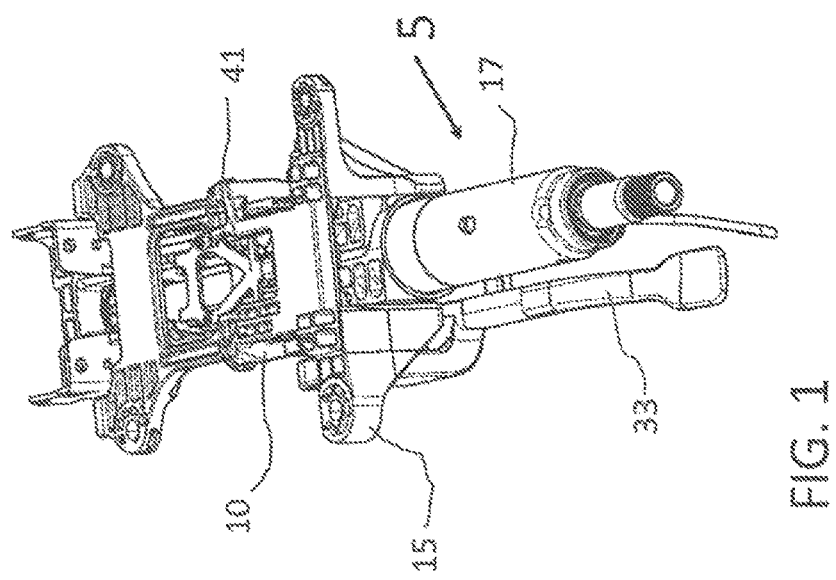
FIG. 1

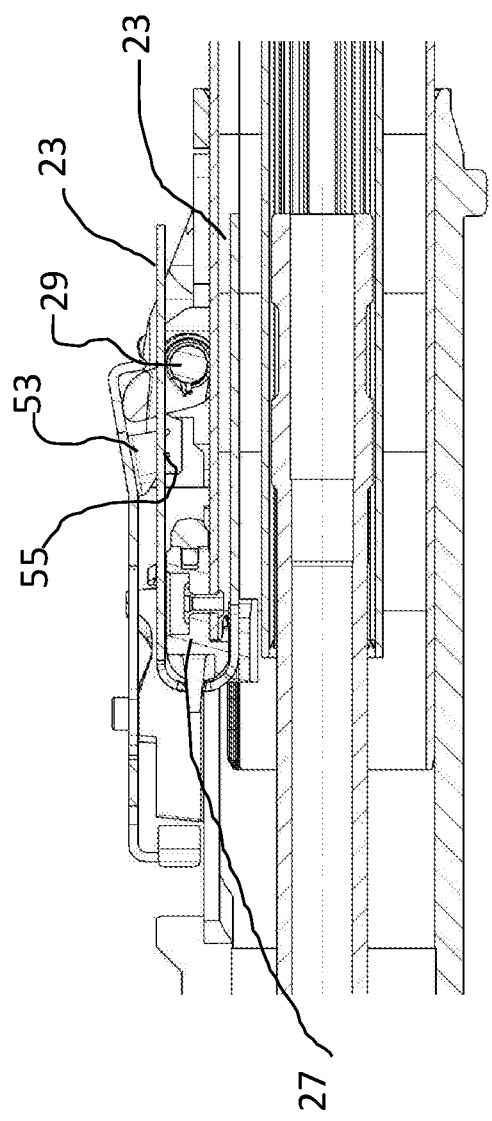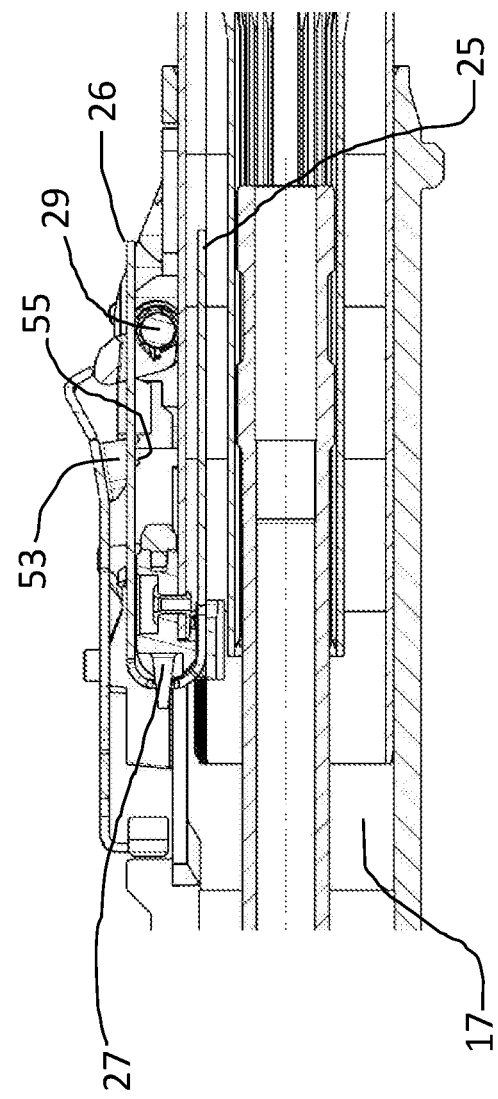

US 10,807,632 B2

LOW INITIAL RESISTANCE STEERING COLUMN CRASH APPARATUS

CROSS REFERENCE TO RELATED APPLICATIONS

This application claims the benefit of publication no. WO/2018/025160 published Feb. 8, 2018, international application no. PCT/IB2017/054654 filed Jul. 31, 2017, which claims the benefit of U.S. provisional patent application Ser. No. 62/369,396 filed Aug. 1, 2016.

BACKGROUND OF THE INVENTION

Many vehicles have steering columns that can be adjusted to provide a comfortable position for the user of the vehicle. These adjustable steering columns should also collapse when sufficient load is placed upon the steering wheel of the vehicle, such as in a crash. Most modern vehicles have a collapsing mechanism within the steering column, which is initiated when a load above a predetermined value is experienced by the steering wheel. Such a single mode for collapsing the column can result in forces higher than necessary and may not provide as much protection as desired for the user of the vehicle. Accordingly, there is a need for a two stage collapse system, which can reduce the harshness of the initial impact.

SUMMARY OF THE INVENTION

An adjustable steering column that is designed to absorb energy by collapsing is described. The steering column has a jacket body secured to the vehicle and a steering shaft assembly adjustably and slidably positioned in the jacket body. An energy absorbing strap has a first end secured to the jacket body and a second end releasably secured to the steering shaft assembly. The energy absorbing strap being disposed to deform to absorb energy when the steering shaft assembly is displaced with respect to the jacket body. The energy absorbing strap is deformed at a second predetermined energy absorbing rate. A spring plate has its first end secured to the jacket body and a second end releasably engaging the energy absorbing strap. At least one elongated slot is positioned adjacent the first end of the spring plate. A securing device is positioned in the at least one slot to secure the spring plate to the jacket body. The securing device secures the spring plate to the jacket body at a first energy absorbing rate. The first energy absorbing rate being lower than the second energy absorbing rate.

IN THE DRAWINGS

FIG. 1 is a perspective view of the steering column of the present invention.

FIG. 2 is a partial perspective view.

FIG. 3 is a partial top elevational view.

FIG. 4 is a partial cross sectional view.

FIG. 5 is a partial cross section view.

DETAILED DESCRIPTION OF THE INVENTION

Figure 6:
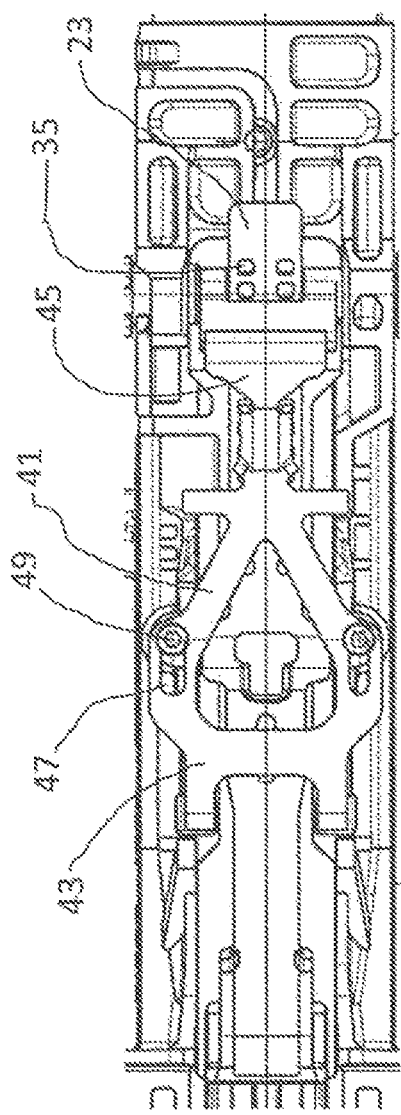
FIG. 6 is a partial top elevational view.
Figure 7:
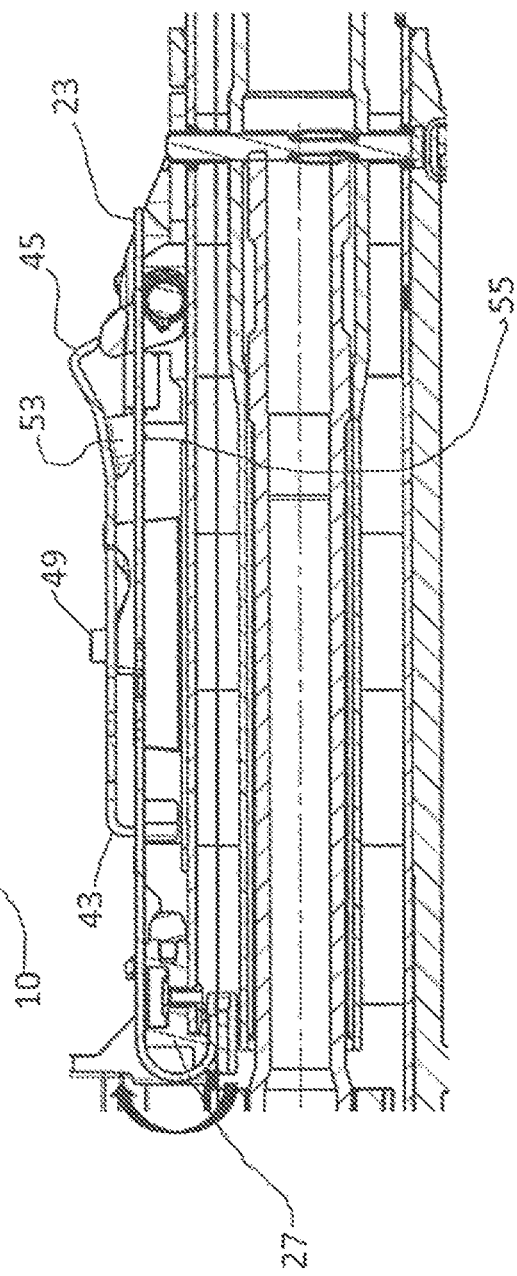
FIG. 7 is a partial cross sectional view.

The invention is directed to an adjustable steering column for use in a vehicle. The steering column is designed to absorb energy in the event of an incident, such as a crash, where significant loads are placed on the steering column. More particularly, the steering column has the ability to provide a low initial resistance to crash forces while retaining the ability to provide higher resistance as the crash forces continue to impact the steering column. The features of the invention will be more readily understood by referring to the attached drawings In connection with the following description.

The steering column 5 has a jacket body 10 that is secured to bracket 15. The bracket 15 is secured to the body of the vehicle in a manner well-known in the industry. A shaft assembly 17 is slidably positioned in the jacket body 10 and is disposed to receive a steering wheel. The steering wheel is used to control the steering input for the vehicle in a manner well-known in the art. The steering column 5 is designed to be able to move in a telescoping or in and out direction to provide a comfortable steering position for the user of the vehicle.

To control the telescoping movement of the shaft assembly a lever 33 is secured to one end of the shaft assembly to control this movement in a manner well known in the industry. An end of the lever extending in a direction towards the end of the shaft assembly 17 where the steering wheel is mounted. The end of the lever is positioned to be convenient for the user of the vehicle.

To control the collapsing of the steering column an energy absorbing strap 23 is secured to the shaft assembly 17. the second end 26 of an energy absorbing strap 23 is releasably secured to the shaft assembly 17. The first end 25 of the energy absorbing strap passes around block 27 positioned on the shaft assembly. The energy absorbing strap extends past the block 27 and extends over the jacket body 10. The portion of the energy absorbing strap 23 that extends over the jacket body has a plurality of openings 35.

A spring plate 41 has a first end 43 that is secured to the jacket body 10. The first end of the spring plate has at least one elongated slot 47 and a bolt 49 extends through the elongated slot to engage a boss 51 positioned on the jacket body. The bolt 49 secures the first end of the spring plate 41 to the jacket body 10. The elongated slot 47 has a length sufficient to meet the energy absorbing requirements of the vehicle manufacturer. In practice it is been found preferable to have an elongated slot 47 positioned on each side of the first end of the spring plate with a corresponding bolt and boss that can be used to secure the first end of the spring plate to the jacket body. The second end 45 of the spring plate 41 is positioned over the surface of the energy absorbing strap that extends over the jacket body. The spring plate has at least one flange 53 that extends from the spring plate in a direction towards the energy absorbing strap 23. In practice, it has been found to be preferable to have two flanges that extend from the spring plate 41. The at least one flange 53 has a plurality of teeth 55 that are disposed to engage the openings 35 in the energy absorbing strap. The engagement of the teeth with the openings prevents the shaft assembly 17 from moving axially toward the front of the car relative to the jacket body 10. When it is desired to adjust the position of the steering wheel mounted on the steering shaft 19 in a telescopic fashion, the lever 33 is rotated in a manner that causes the second end 45 of the spring plate 41 to move in a direction away from the energy absorbing strap 23. This movement of the second end of the spring plate disengages the teeth 55 on the at least one flange 53 from the openings 35 on the energy absorbing strap 23 and allows the shaft assembly to be moved in an adjusting manner with respect to the jacket body.

When loads are placed on the adjustable steering column, such as in a crash, it is important that the steering column have the ability to collapse under controlled conditions to provide added protection For the user of the vehicle. When sufficiently high loads are placed on the steering wheel the steering column must be able to collapse in a direction towards the front of the vehicle to protect the user of the vehicle, it has been found to be desirable to have a progressive collapse of the steering column to provide as much protection as possible for the user of the vehicle.

The energy absorbing strap 23 provides the primary resistance to control the movement of the shaft assembly 17 in an axial direction relative to the jacket body 10. The energy absorbing strap is connected to the shaft assembly 17 and extends around the block 27. In a crash, the shaft assembly 17 is advanced in the jacket body 10 in a direction towards the front of the vehicle. This movement of the shaft assembly causes the block 27 on the shaft assembly 17 to also advance in a direction towards the front of the vehicle. As the energy absorbing strap 23 passes around the block 27 the energy absorbing strap will be deformed and caused to unroll as the block 27 advances towards the front of the vehicle. As the second end 26 of the energy absorbing strap 23 is secured to jacket body 10 by the teeth 55 on the at least one flange 53, that extends from the spring plate 41, the second end of the energy absorbing strap is in a fixed position. The deformation of the energy absorbing strap provides a controlled resistance to movement of the shaft assembly 17 relative to the jacket body 10. The energy absorbing strap 23 is usually formed of a sheet metal type of material or other similarly rigid material and it takes a deformation force above a second predetermined level to deform the energy absorbing strap. The second predetermined level of force may be unnecessarily high for the user of the vehicle before the steering column 5 begins to collapse.

The bolts 49 positioned in the elongated slots 47 in the spring plate 41 are tightened to a predetermined torque which secures the spring plate to the bosses 51 on the jacket body 10 for a first predetermined level of sliding force. When a load is placed on the adjustable steering column, such as in a crash, the elongated slots 47 beneath the bolts 49 will slide when a force above the first predetermined level of sliding force is applied to the shaft assembly 17 in a direction towards the front of the vehicle. This will allow the spring plate 41 to move in a direction towards the front of the vehicle and the flange 53 that engages the energy absorbing strap 23 will also move in a direction towards the front of the vehicle. This motion of the flange 53 allows the energy absorbing strap 23 to also move in a direction towards the front of the vehicle as the energy absorbing strap is engaged by the teeth 55 on the flange 53. This motion of the energy absorbing strap 23 allows the strap to move with the block 27 that is positioned on the shaft assembly 17. Accordingly, the steering column 5 can collapse at lower load conditions and this places less impact on the user of the vehicle. This initial collapse of the steering column will take place until the bolts 49 have moved the entire length of the elongated slots 47. Once the bolts are at the opposite end of the slots 47, continued collapse of the steering column require the deformation of the energy absorbing strap 23 and the application of a load on the steering column that is above the second predetermined level. As the steering column collapse, the movement of the steering wheel will be in stages with a lower force required for the first portion of the collapse. This type of progressive collapse reduces the harshness of the collapse for the user of the vehicle.

FIGS. 8-11 show additional features of the invention that will allow for additional control of the initial collapse of the steering column. The additional features allow for the fine tuning of the collapse of the steering column in response to loads placed on a steering column such as in a crash. The feature shown in these figures all relate to different configurations for the at least one slot that is positioned in the spring plate 41.

Figure 8:
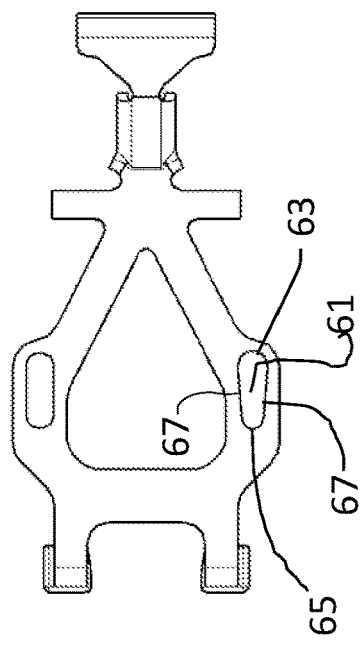
FIG. 8 is a partial top elevational view of another configuration for the elongated slot.

FIG. 8 shows an elongated slot 61 that has a generally tear dropped shape. The elongated slot 61 has a larger width end 63 and a smaller width end 65. The larger width end 63 is located closer to the second end 45 of the spring plate 41. The side wall 67 of the slot 61 are disposed at an angle as they extend from the larger width end 63 to the smaller width end 65 of the elongated slot 61. The larger width end 63 of the elongated slot 61 provides less surface area for the securing device such as bolt 49 to engage. Accordingly, there will be more resistance to sliding of the elongated slot 61 when the bolt 49 is located at the smaller width end of the elongated slot. This results in more force being necessary to cause a sliding motion between the bolt 49 and the slot 61 so that more initial force is required to initiate the collapsing of the steering column in the event of an accident. As the sidewalls 67 of the elongated slot 61 are disposed at an angle from the larger width end 63 to the smaller width end 65 there will be progressively more surface area for the bolt 49 to engage and this will require progressively lower levels of force to cause the elongated slot 61 to slide with respect to the bolt 49. This configuration for the elongated slot 61 will allow a designer to fine tune the level of force that is necessary to collapse the steering column and result in a progressive collapse as the force on the steering column decreases. The size of the larger width end 63 and the smaller width end 65 can be designed to achieve the progressive force requirements desired by the designer of the steering column to achieve the desired control collapse parameters for the steering column.

Figure 9:
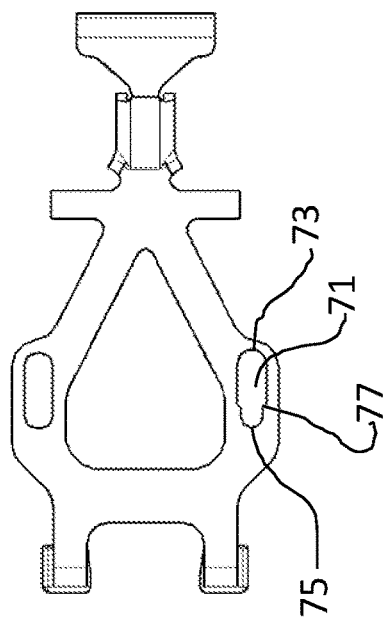
FIG. 9 is a partial top elevational view of another configuration for the elongated slot.

FIG. 9 shows an elongated slot 71 with a graduated width. The first end of the elongated slot 71 has a first width that is larger than the second width at the second or opposite end of the elongated slot 71. There is a transition point 77 where the larger width first end 73 ends and the smaller width second end 75 begins. With this configuration, the slot 71 would slide with respect to the bolt 49 with a first level of force in the larger width first end 73 of the slot 71. At the transition point 77 the sliding force would increase as the second end 75 has a smaller width than the first end 73. The smaller width of the second end provides more surface area for the bolt 49 to engage and thus it would require a higher level of force to maintain the sliding motion between the slot 71 and the bolt 49. As the second end 75 of the slot 71 has a shorter length than the larger width first end 73, the transition point 77 is closer to the second end 75 of the slot 71. This will result in the force require to cause the slot 71 to slide with respect to the bolt 49 to decrease as the bolt 49 advances towards the first end 73 of the slot. This configuration would result in a step type of decrease in the force necessary to collapse the steering column as the steering column continues to collapse. This decrease in the sliding force necessary to continue the collapse of the steering column will provide a stepped decrease in the force just before the additional increase of force that is necessary to provide a deformation of the energy absorbing strap 23 to continue the collapse of the steering column.

Figure 10:
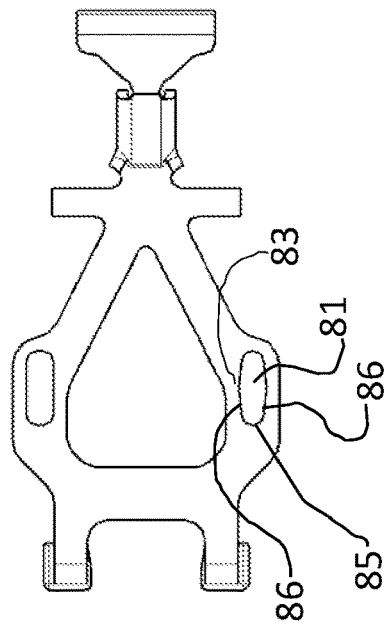
FIG. 10 is a partial top elevational view of another configuration for the elongated slot.

FIG. 10 shows an elongated slot 81 with an area of increased width 83 located generally in the center of the elongated slot. The first end 84 and the second end 85 have the same width and the sidewalls 86 of the elongated slot extend at an angle to the area of increased width 83 located in the center of the elongated slot 81. In this arrangement for the elongated slot 81 there will be less area for the bolt 49 to engage in the center of the elongated slot 81. Accordingly, it will require a higher degree of force to slide the slot with respect to the bolt 49 at the first and second ends of the slot than it will in the area of increased width 83 which is located in the center of the elongated slot. This configuration requires an initial force to cause the initiation of the collapse of the steering column with a small decrease in the force necessary to continue the collapse of the steering column for a set distance and then an increase in the force necessary to continue the collapse of the steering column as the bolt 49 moves toward the first end 84 of the elongated slot.

Figure 11:
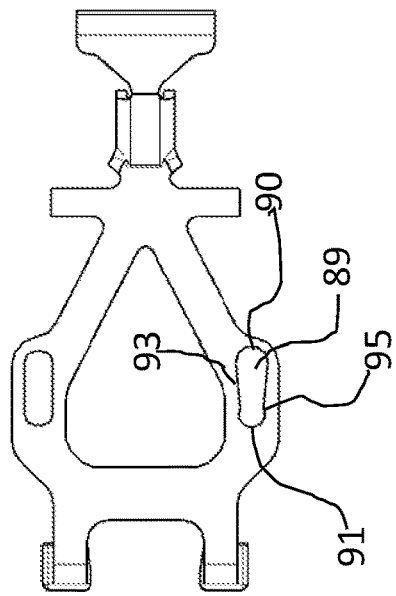
FIG. 11 is a partial top elevational view of another configuration for the elongated slot.

FIG. 11 shows an elongated slot 89 that has a generally key hole shape. The first end 90 of the slot has a first width and the second end 91 of the slot 89 has a second width. The first width is larger than the second width. The sidewalls 93 of the slot 89 extend at an angle from the larger first width at the first end to the smaller second width at the second end. There is a transition point 95 close to the second end 91 has a width that is slightly smaller than the width of the second end 91. With this configuration for the slot 89 the force necessary to slide the slot with respect to the bolt 49 will progressively decrease as the bolt moves from the second end 91 to the first end 90 of the slot 89. Once the transition point 95 is reached there will be a slight decrease in the force necessary to cause the slot 89 to move with respect to the bolt 49.

The various arrangements for the elongated slots shown in FIGS. 8-11 allow the designer of a collapsible steering column to fine tune the initial collapsing forces for the steering column in the result of an accident or other applications of high forces to the vehicle in which the steering column is located. The orientation for the slots shown in FIGS. 8-11 could be rotated 180® to adjust the force required to slide the slots with respect to the bolt 49 in the opposite manner. This provides even more flexibility to adjust the force required for the initial collapse of the steering column.

The above detailed description of the present invention is given for explanatory purposes. It wilt be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. An adjustable steering column for a vehicle comprising;
   a jacket body [10] secured to the vehicle;
   a steering shaft assembly [17] adjustably positioned in the jacket body;
   an energy absorbing strap [23] having a first end [25] secured to the steering shaft assembly and a second end [26] releasable secured to the jacket body, the energy absorbing strap disposed to deform to absorb energy when the steering shaft assembly is displaced with respect to the jacket body, the energy absorbing strap deforming at a second energy absorbing rate;
   a spring plate [41] having a first end [43] secured to the jacket body [10] and a second end [45] releasably engaging the energy absorbing strap;
   at least one elongated slot [47] positioned adjacent the first end of the spring plate; and
   a securing device [49] positioned in the at least one slot [47] to secure the spring plate to the jacket body, the securing device securing the spring plate to the jacket body at a first energy absorbing rate, the first energy absorbing rate being lower than the second energy absorbing rate wherein the spring plate absorbs the initial energy before the energy absorbing strap is deformed when the steering shaft assembly is displaced relative to the jacket body, in a crash condition.

2. The steering column of claim 1 wherein the at least one elongated slot [47] is positioned on each side of the spring plate and the securing device [49] is positioned in each slot to secure the spring plate to the jacket body.

3. The steering column of claim 1 wherein the jacket body has a threaded boss [51] position in alignment with the at least one elongated slot.

4. The steering column of claim 3 wherein the securing device [49] is a threaded bolt that is threadingly positioned in the threaded boss.

5. The steering column of claim 1 wherein the at least one slot [47] has a length from about 5 mm to about 15 mm.

6. The steering column of claim 5 wherein the at least one elongated slot [47] is designed to slide with respect to the securing device when a load above a predetermined level is applied to the steering column.

7. The steering column of claim 1 wherein the at least one elongated slot [47] has a generally rectangular shape.

8. The steering column of claim 1 wherein the at least one elongated slot [61] has a generally elongated tear drop shape.

9. The steering column of claim 8 wherein the tear drop shaped elongated slot [61] has a larger width end [63] that is located closest to the second end [45] of the spring plate [41], the larger width of this end of the elongated slot providing less surface area for the securing device and the jacket body to engage.

10. The steering column of claim 1 wherein the at least one slot [71] has a graduated width with a reduced width portion [73] of the slot being located closest to the first end [73] of the spring plate, the reduced width portion of the slot providing more surface area for the securing device to engage.

11. The steering column of claim 1 wherein the at least one slot [81] has an area of enlarged width [83] located in a center section of the slot, the area of enlarged width providing less surface area for the securing device to engage.

12. The steering column of claim 1 wherein the at least one slot [89] has a keyhole shape with a rounded enlarged width section [90] on one end, a smaller width section [91] on the other end of the slot, whereby a force necessary to slide in the slot with respect to the bolt [49] progressively decreases as the bolt moves from the small width section [91] to the rounded enlarged width section [90].

* * * * *